United States Patent [19]

Villa-Massone et al.

[11] 4,120,303

[45] Oct. 17, 1978

[54] TONGS, IN PARTICULAR FOR MOUNTING EAR-BUTTONS ON ANIMALS

[75] Inventors: René Villa-Massone, Sannois; Michel Divaret, La Milesse, both of France

[73] Assignee: Cooper France S. A., Paris, France

[21] Appl. No.: 780,826

[22] Filed: Mar. 24, 1977

[30] Foreign Application Priority Data

Mar. 29, 1976 [FR] France ............................... 76 09024
Nov. 17, 1976 [FR] France ............................... 76 34618

[51] Int. Cl.² .............................................. A01K 11/00
[52] U.S. Cl. ..................................... 128/330; 81/323; 81/373
[58] Field of Search .......................... 128/330, 329 R; 119/135; 40/301, 302; 81/313, 352, 373, 323

[56] References Cited

U.S. PATENT DOCUMENTS

2,570,048  10/1951  Cooke et al. ................. 40/301 X

FOREIGN PATENT DOCUMENTS

1,216,007  5/1966  Fed. Rep. of Germany .......... 128/330

Primary Examiner—Robert W. Michell
Assistant Examiner—Michael H. Thaler

[57] ABSTRACT

Tongs, in particular for mounting ear-buttons on animals, comprising a first lever and a second lever each constituting a handle and pivoted together, a first jaw and a second jaw actuated by the levers and each provided with a device for maintaining a part of the ear-button and a return spring for biasing the jaws to the open position. The first and second jaws are connected to the first and second levers by a mechanism for maintaining the jaws always parallel. It further comprises a rapidly actuated device for opening the jaws when the first and second levers are moved toward each other.

14 Claims, 8 Drawing Figures

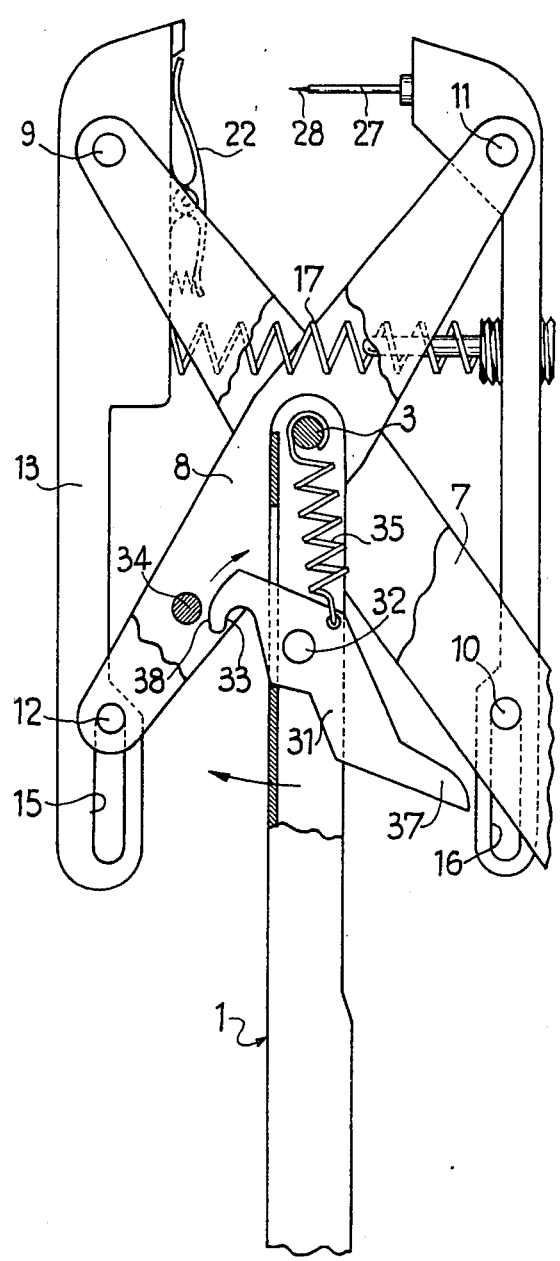
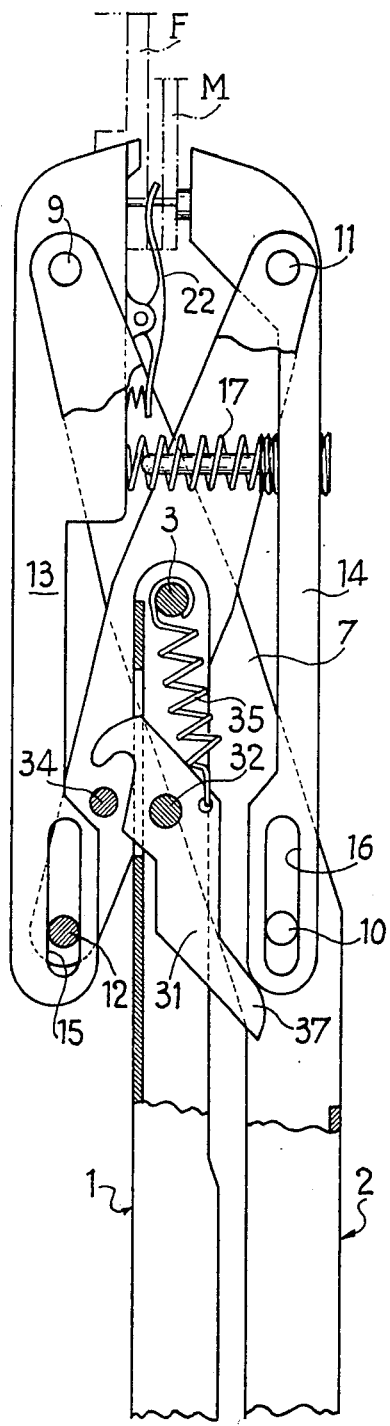

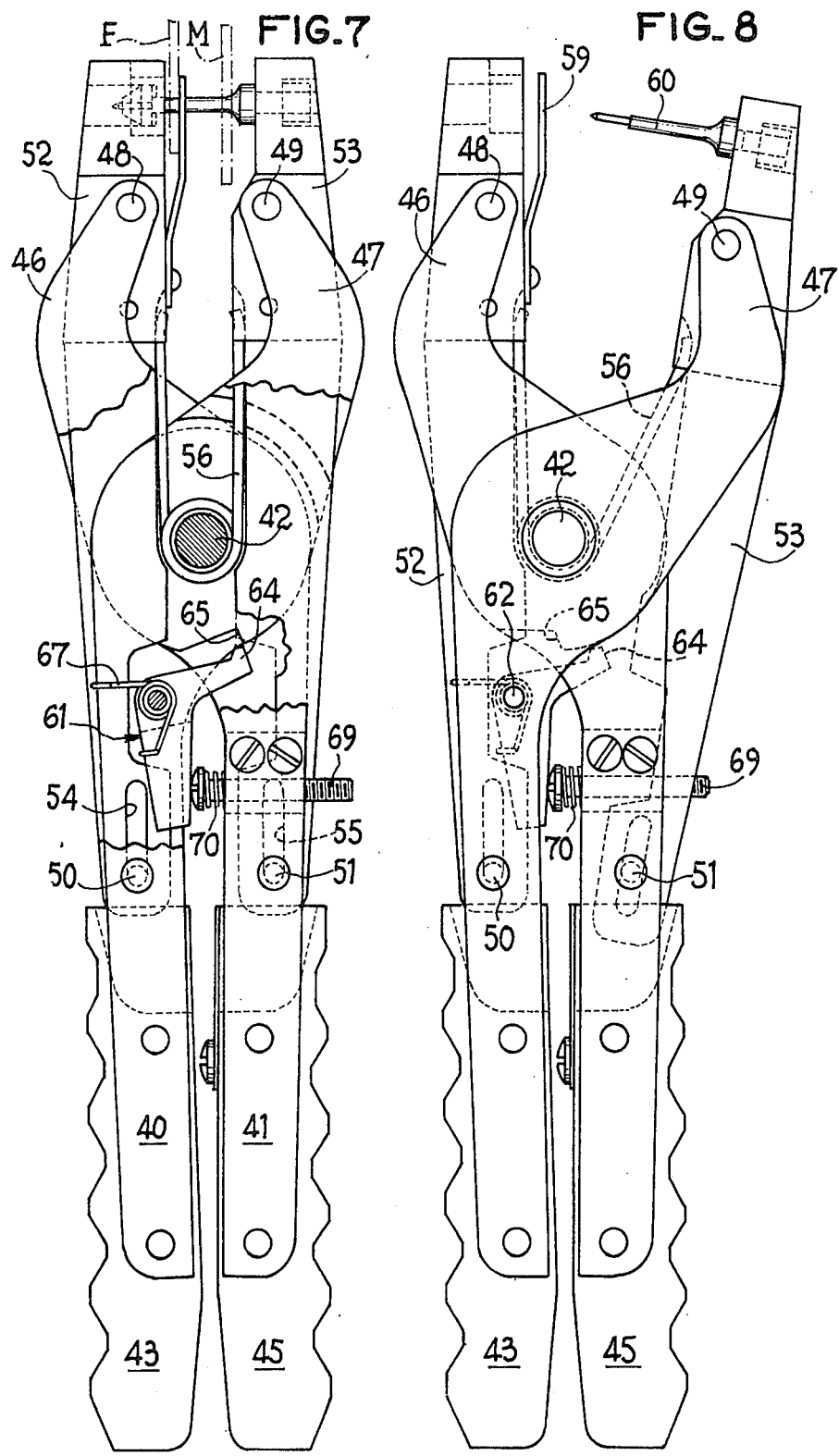

TONGS, IN PARTICULAR FOR MOUNTING EAR-BUTTONS ON ANIMALS

The present invention relates to the mounting of devices for identifying animals and in particular ear-buttons and more particularly relates to a tongs for mounting the ear-button or the like.

Conventional ear-buttons are generally constructed in two parts adapted to be disposed on each side of the ear of an animal.

A first part of the ear-button comprises a point adapted to ensure the perforation of the ear and to be engaged in an orifice formed in the second part of the ear-button so as to maintain the latter in position.

Tongs are known for placing ear-buttons in position which comprise, on each one of their jaws, means for maintaining the two parts of the ear-button to be mounted.

The tongs of this type have a circular movement so that, bearing in mind, on one hand, a certain lack of precision in the disposition of the parts of an ear-button on the jaws of the tongs and, on the other hand, a possible sliding of the point in the course of the perforation of the ear, it is sometimes difficult to achieve the engagement of this point with the orifice of the second part of the ear-button.

A difficulty in the use of the conventional tongs more important than that mentioned hereinbefore, resides in the fact that, as soon as the ear of an animal is perforated, the animal, under the effect of pain, starts to move so that the ear still maintained by the tongs is liable to be torn.

Moreover, if the operator does not have time to disengage the tongs, the latter can escape from the operator and remain hooked to the ear of the animal.

An object of the invention is to overcome the aforementioned drawbacks by providing a tongs in particular for mounting ear-buttons which, while being simple in construction, ensures a rapid mounting of the ear-button and an immediate disengagement of the jaws of the tongs.

According to the invention, there is provided a tongs, in particular for mounting ear-buttons for animals, comprising a first lever and second lever constituting handles and pivoted together by a pivot pin, a first jaw and second jaw actuated by said levers and each provided with means for maintaining a part of an ear-button, and a return spring for returning the jaws to the open position, the first and second jaws being connected to the first and second levers by a mechanism for temporarily maintaining the jaws parallel to each other, the tongs further comprising rapidly actuated means for opening the jaws when the first and second levers are moved toward each other, wherein the mechanism for maintaining the jaws parallel comprises a branch of the second lever which is pivoted in the middle thereof to a link, which is rendered integral with the first lever by temporary immobilizing means, by the pivot pin of the first and second levers, the ends of the first and second jaws, carrying the means for maintaining the parts of the ear-button, being respectively pivoted to the corresponding ends of the branch of the second lever and of the link, the opposite end of the second jaw being pivoted to the second lever, whereas the opposite end of the first jaw is pivoted, in the armed position of the tongs, to the assembly constituted by the first lever and the link which are rendered integral with each other by the temporary immobilizing means.

In the drawings, given solely by way of example:

FIG. 3 is an elevational view of the tongs in the course of mounting an ear-button;

FIG. 4 is a view similar to FIG. 3 of the tongs in the course of its re-arming;

FIG. 7 is an elevational view, with parts cut away, of the tongs shown in FIG. 5 in the course of mounting an ear-button, and FIG. 8 is a view similar to FIG. 7 of the tongs in the course of disengagement.

Figure 1:
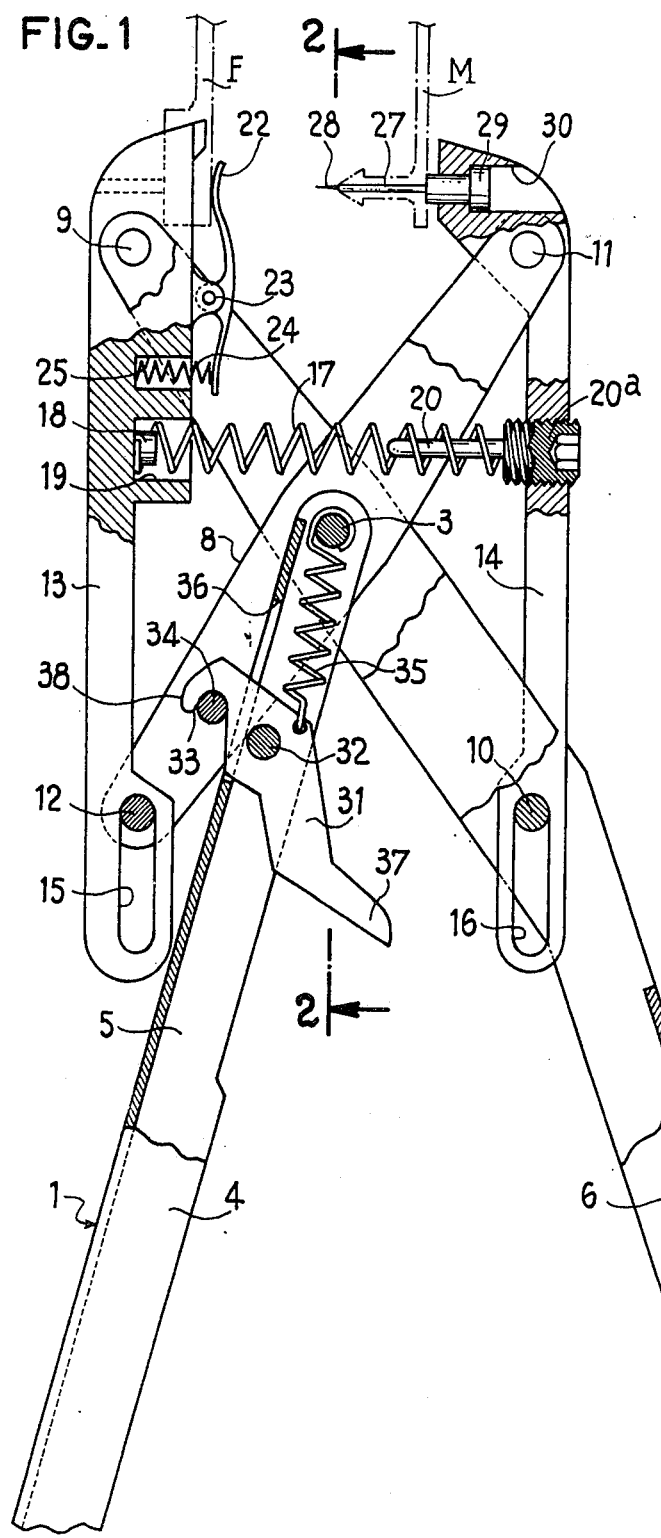
FIG. 1 is an elevational and sectional view of a tongs according to the invention ready for use.

The tongs shown in FIG. 1 comprises two levers 1 and 2 which are pivoted together by a pivot pin 3. The lever 1 comprises a portion 4 of tubular shape forming a handle or grip and a portion 5 of U-sectional shape.

The lever 1 is pivoted to the lever 2 at the end of its portion 5 opposed to the handle 4.

The lever 2 is a cranked lever which comprises also a tubular portion 6 constituting a handle or grip and a portion formed by two branches 7 which are parallel and planar and make an obtuse angle with the handle 6. The branches 7 are connected in the middle thereof to the lever 1 by the pivot pin 3 on which two parallel links 8 are also pivotally mounted.

The ends of the branches 7 and the links 8 are interconnected in pairs respectively by pins 9, 10, and 11, 12.

Mounted by their ends on the pins 9, 12 and on the pins 10, 11 respectively, are two parallel jaws 13, 14. The pins 12 and 10 are respectively engaged in apertures 15 and 16 formed in the jaws. The apertures 15, 16 are parallel to the direction of the jaws 13, 14.

The jaws 13 and 14 are maintained spaced apart from each other by a spring 17 one end of which is mounted on a lug 18 provided in a transverse recess 19 in the jaw 13, whereas the other end of the spring is guided by a finger member 20 fixed to the jaw 14. The stress of the spring 17 is adjustable by a screw 20a mounted in the jaw 14. This permits varying the speed of actuation of the tongs.

Figure 2:
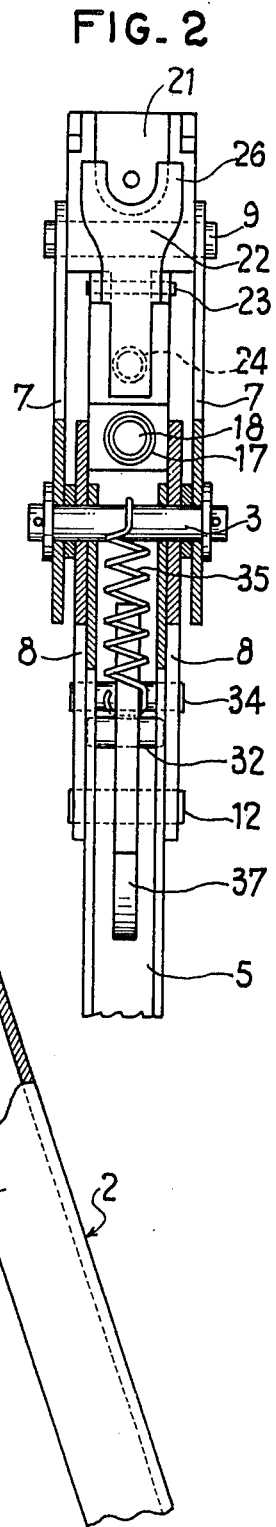
FIG. 2 is a sectional view taken on line 2—2 of FIG. 1.

The ends of the jaws 13, 14 opposed to the apertures 15, 16 comprise means for maintaining the ear-buttons. In the particular case of the application of the tongs to the mounting of an ear-button of the type shown in FIG. 2, the jaw 13 terminates in a fork 21 adapted to receive the female part F of the ear-button. This part F is held stationary against the fork 21 by a chap 22 which is pivotally mounted on the jaw 13 by a pivot pin 23 and applied against the jaw 13 by a spring 24 which is disposed in an aperture 25 formed in the jaw 13.

The chap 22 comprises, at the end thereof opposed to the spring 24, a fork 26 which cooperates with the fork 21 of the jaw 13 to clear the orifice of the female part F.

In the illustrated embodiment, the jaw 14 has, at the end thereof opposed to the aperture 15, a rod 27 which is provided with a point 28 and extends into a passageway formed in the point of the male part M of the ear-button. The rod 27 is centered with respect to the fork 21 of the jaw 13.

The tongs further comprises means for temporarily immobilizing the lever 1 with respect to the links 8. This immobilizing means comprise a lock member 31 which is pivotally mounted on the lever 1 by a pivot pin 32 and has at one end a hook 33 which is maintained in engagement with an abutment 34 fixed to the links 8 by a spring 35 which has one end hooked to said lock member whereas its other end is hooked to the pivot pin 3.

The hook 33 of the lock member 31 projects out of the lever 1 by way of an aperture 36 formed in the web of the portion 5 of the lever.

At the end thereof opposed to the hook 33 the lock member 31 has an extension 37 constituting a cam and adapted to cooperate with the end of the jaw 14 so as to rotate the lock member, in opposition to the action of the spring 35, and disengage the hook 33 from the abutment 34 and thereby release the links 8.

The hook 33 has an outer surface 38 the function of which will be explained hereinafter.

The operation of the tongs according to the invention will be described with reference to FIGS. 1, 3 and 4.

In the state of the tongs shown in FIG. 1, the tongs is ready to operate. The male and female parts M and F of the ear-button are respectively fixed to the ends of the jaws 13 and 14 of the tongs. The ear of the animal is introduced between the jaws and the levers 1 and 2 of the tongs are moved toward each other. The branches 7 of the lever 2 and the links 8, rendered integral with the lever 1 by the lock member 31 which is engaged by its hook 33 with the abutment 34, are driven by the movement of the levers 1 and 2 toward each other, and this causes the jaws 13 and 14 to move toward each other in opposition to the action of the spring 17, and the simultaneous sliding of the pins 12 and 10 in the respective apertures 16 and 15 of the jaws, so that the latter remain parallel to each other in the course of their displacement. When, in the course of the movement of the jaws 13 and 14 toward each other, the extension 37 of the lock member 31 comes in contact with the corresponding end of the jaw 14, the lock member is driven in rotation about the pin 32 in opposition to the action of the spring 35 so that the hook 33 of the lock member leaves the abutment 34 and releases the links 8 with respect to the lever 1.

The spring 17, in extending, then suddenly moves the jaws 13 and 14 away from each other which respectively turn around the pins 9 and 10 integral with the branches 7 of the lever 2. The ear-button, mounted in the course of the tightening of the tongs, is suddenly released owing to the fact that the rod 27 moves out of the point of the male part of the ear-button so that the slightest movement of the animal causes the female part of the ear-button to slide out of contact with the chap 22. To re-arm the tongs it is sufficient to move the levers 1 and 2 apart until the outer surface 38 of the hook 33 comes in contact with the abutment 34 (FIG. 4). This surface 38 constitutes a cam and causes the rotation of the lock member in the direction of the arrow in opposition to the action of the spring 35 until the hook 33 once more engages on the abutment 34.

The tongs is now ready to receive a new ear-button.

The arrangement just described permits a rapid mounting of the ear-button and a practically instantaneous disengagement of the tongs.

The displacement of the jaws parallel to each other in the course of the tightening of the tongs facilitates the engagement of the male part in the female part.

Figure 5:
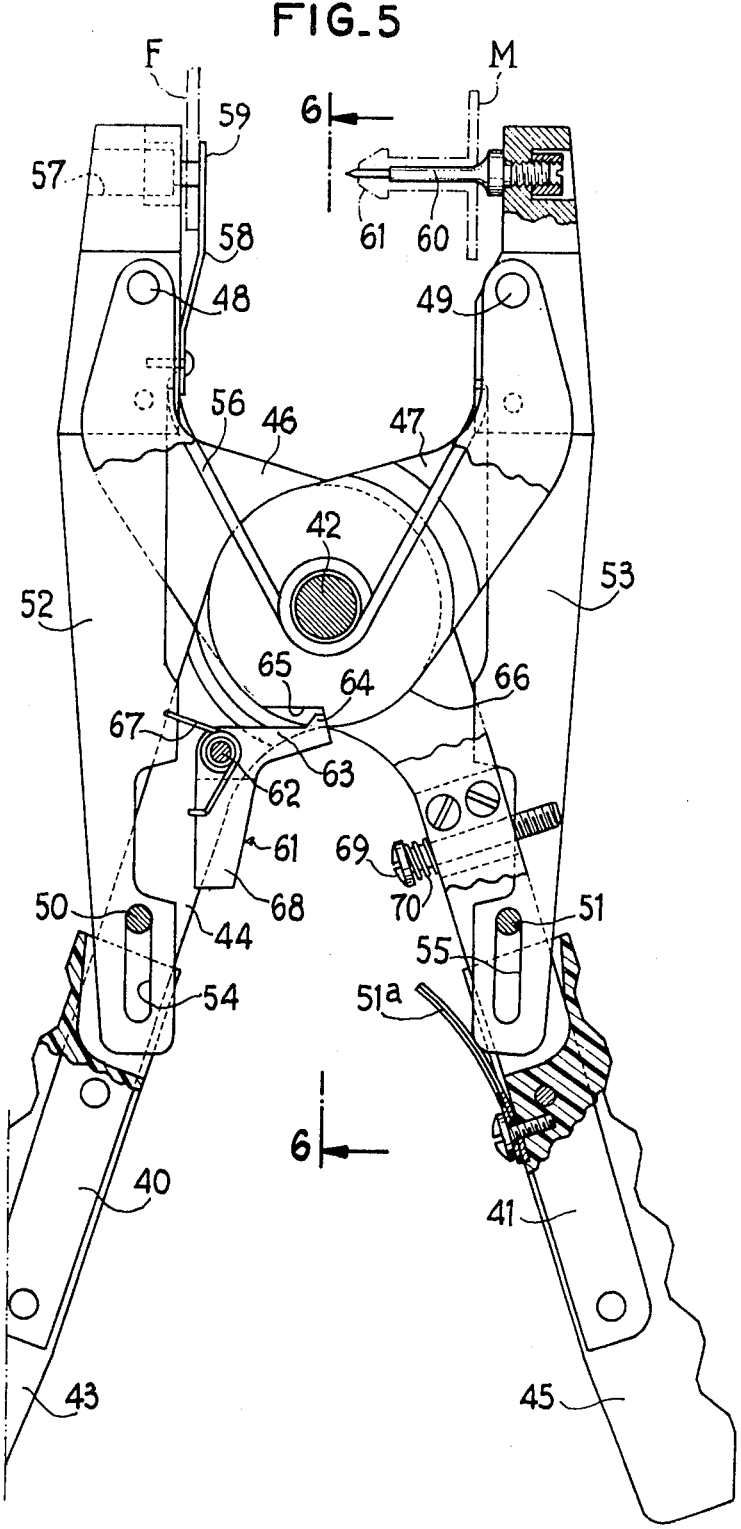
FIG. 5 is an elevational view, with parts cut away, of another embodiment of the tongs according to the invention ready for use.
Figure 6:
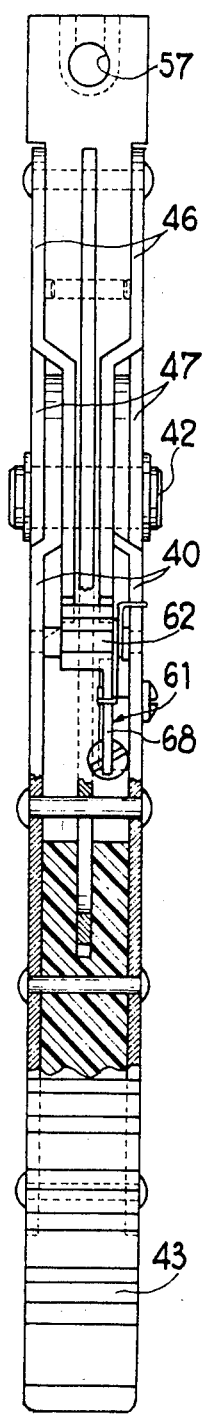
FIG. 6 is a sectional view taken on line 6—6 of FIG. 5.

The tongs shown in FIG. 5 comprises two levers 40 and 41 which are pivoted to each other by a pivot pin 42. The lever 40 is formed by two symmetrical sheet metal members fixed to a handle or grip 43. It is pivoted to the lever 41 at the end of the portion 44 thereof opposed to the handle 43. The lever 41 is also constructed from two identical sheet metal members, fixed to a handle or grip 45, an extension having the general shape of an S constituting two planar parallel branches 46.

The branches 46 of the lever 41 are connected, roughly in the middle thereof, to the lever 40 by the pivot pin 42 on which two parallel links 47 are also pivotally mounted. The ends of the branches 46 and the links 47 are interconnected in pairs respectively by pins 48, 49, the parts of the levers 40 and 41 being moreover interconnected by pins 50, 51 respectively.

Mounted by their ends on the pins 48, 50 and on the pins 51, 49 respectively, are two parallel jaws 52, 53, the pins 50 and 51 being respectively engaged in apertures 54 and 55 in the jaws. The apertures 54, 55 are parallel to the direction of the jaws 52, 53.

The jaws 52, 53 are maintained spaced apart from each other by a spring 56 which is mounted on the pivot pin 42 connecting the branches 46 of the lever 41 to the links 47, said spring having branches which are supported respectively in the vicinity of the ends of the branches 46 and the links 47. The lever 41 carries a spring strip 51a for damping the shocks, upon opening, between the jaw 53 and the pin 51.

The ends of the jaws 52, 53 opposed to the apertures 54, 55 comprise means for maintaining the ear-buttons. In the particular case of the tongs shown in FIG. 5, the jaw 52 has a transverse orifice 57 against which female part F of the ear-button is placed.

This part F is immobilized against the orifice 57 by a spring strip 58 which is secured to the jaw 52 and has a recess 59 for clearing the orifice of the female part F.

In the illustrated embodiment, the jaw 53 has, at the end thereof opposed to the aperture 55, a rod 60 which is provided with a point 61 and extends into a passageway formed in the point of the male part M of the ear-button. The rod 60 is centered with respect to the transverse orifice 57 of the jaw 52.

The tongs further comprises means for temporarily immobilizing the lever 40 with respect to the link 47. These immobilizing means comprise a lock member 61 pivotally mounted on the lever 40 by a pivot pin 62. The lock member 61 has a first branch 63 which terminates in a nose portion 64 which is cooperative with a notch 65 in a circular portion 66 of one of the links 47 to prevent the rotation of the links with respect to the lever 40. The lock member 61 is biased to the position thereof shown in FIG. 5 by a spring 67. A second branch 68 of the lock member 61 constitutes a heel and cooperates, when the levers 40 and 41 move toward each other, with the head of a screw 69 which is fixed in the lever 41 and is adjustable in position. A spring 70 for immobilizing the screw 69 is interposed between the head of the latter and the lever 41.

The operation of the tongs according to the invention will be described with reference to FIGS. 5, 7 and 8.

In the state of the tongs shown in FIG. 5, the tongs is ready for use. The male and female parts M and F of the ear-button are respectively fixed to the ends of the jaws 52 and 53 of the tongs. The ear of the animal is introduced between the jaws and the levers 40 and 41 of the tongs are moved toward each other. The branches 46 of the lever 41 and the links 47, rendered integral with the lever 40 by the lock member 61 which is engaged by its nose portion 64 with the notch 65 formed in one of the links 47, are driven by the movement of the levers 40 and 41 toward each other and this moves the jaws 52 and 53 toward each other in opposition to the action of the spring 57 and causes the simultaneous sliding of the pins 50 and 61 in the respective apertures 64 and 55 of the jaws so that the latter remain parallel to each other in the course of their movement toward each other.

When, in the course of the moving together of the jaws 52 and 53, the head of the screw 59 comes into contact with the heel 68 of the lock member 61, the latter is driven in rotation about the pin 62 in opposition to the action of the spring 67 so that the nose portion 64 of the lock member is disengaged from the notch 65 and releases the links 47 with respect to the lever 40 (FIG. 7). Then, the spring 56, in extending, causes the angular displacement of the links 47 with respect to the branches 46 of the lever 41 and consequently the moving apart of the jaws 52 and 53 (FIG. 8). The ear-button, mounted on the ear of the animal in the course of the tightening of the tongs, is released owing to the fact that the rod 60 moves out of the point of the male part of the ear-button, so that the slightest movement of the animal causes the female part of the ear-button to slip out of contact with the spring 58. To re-arm the tongs, it is sufficient to separate the levers 40 and 41 until the nose portion 64 of the lock member 61 is in front of the notch 65 in the corresponding link 47. Then the spring 57 rotates the lock member 61 and causes the engagement of the nose portion 64 in the notch 65. The tongs is then ready to receive a new ear-button.

The tongs according to the invention may be adapted for receiving various types of ear-buttons or rings. For this purpose, it is sufficient to modify the maintaining means provided on the jaws of the tongs or change these jaws.

Having now described our invention what we claim as new and desire to secure by Letters Patent is:

1. A tongs, in particular for mounting an ear-button or ear-ring on animals, comprising a first lever and second lever forming handles, a pivot pin pivotally interconnecting the first and second levers, a first jaw and a second jaw movable between an open position and a closed position, a return spring for returning the jaws to the open position of the jaws, means for connecting the first and second levers respectively to the first and second jaws for shifting the jaws to the closed position of the jaws and comprising a mechanism for temporarily maintaining the jaws parallel to each other, rapidly-actuated means for shifting the jaws to the open position of the jaws when the first and second levers are moved toward each other beyond a position of the levers corresponding to said closed position of the jaws, the mechanism for temporarily maintaining the jaws parallel to each other comprising a link, a branch of the second lever, the link being pivoted to the branch substantially in the middle of the branch, means for rendering the link integral with the first lever and comprising said pivot pin and temporary immobilizing means which are interposed between the link and the first lever, the first and second jaws having end portions carrying means for holding respective parts of the ear-button, the branch of the second lever and the link having end portions respectively pivoted to respective ones of said end portions of the first jaw and second jaw, an opposite end of the second jaw being pivoted and slidably connected to the second lever and an opposite end of the first jaw being pivoted and slidably connected, in an armed position of the tongs, to an assembly comprising the first lever and the link, which first lever and link are rendered integral with each other by the temporary immobilizing means.

2. A tongs as claimed in claim 1, wherein said opposite end of the first jaw is pivoted and slidably connected to an end of the link opposed to said end portion of the link pivoted to the second jaw.

3. A tongs as claimed in claim 1, wherein the pivotal and slidable connection of the first jaw to the link comprises an elongated aperture in the first jaw and a pin carried by the link and engaged in the aperture and the pivotal connection of the second jaw to the branch of the second lever comprises an elongated aperture in the second jaw and a pin carried by the branch of the second lever and engaged in the aperture in the second jaw.

4. A tongs as claimed in claim 1, wherein said temporary immobilizing means for immobilizing the link with respect to the first lever comprise a lock member pivotally mounted on the first lever, an abutment integral with the link, the lock member having a hook cooperative with the abutment, and a spring for biasing the hook against the abutment.

5. A tongs as claimed in claim 4, wherein the rapidly-actuated means for opening the jaws comprise an extension which is provided on an end of the lock member opposed to the hook and constitutes a cam cooperative with an end of the second jaw so as to ensure the release of the link with respect to the first lever and permit the separation of the first and second jaws by the return spring.

6. A tongs as claimed in claim 5, further comprising means for regulating the stress of the return spring so as to adapt the speed of actuation for opening the jaws.

7. A tongs as claimed in claim 4, wherein the first lever has a portion having a U-section and an aperture formed in a web of said U-section portion, the lock member extending through the first lever by way of the aperture in the U-section portion of the first lever.

8. A tongs as claimed in claim 4, wherein the hook of the lock member has an outer surface constituting a cam for re-arming the lock member.

9. A tongs as claimed in claim 1, wherein the pivotal connection of the link to the jaws comprises pivot pins and the link is constituted by two parallel link members which are disposed on each side of the jaws and are interconnected by the respective pivot pins, the branch being formed by two parallel branch portions which are in one piece with the second lever and disposed on each side of the link members and are interconnected by the pivotal connection of the branch to the first jaws.

10. A tongs as claimed in claim 1, wherein said opposite end of the first jaw is directly pivoted and slidably connected to the first lever.

11. A tongs as claimed in claim 10, wherein the pivot and slidable connection of the first jaw to the first lever and the pivotal connection of the second jaw to the second lever each comprise a pin and an elongated aperture formed in the corresponding jaw, the pin being engaged in the aperture of the corresponding jaw.

12. A tongs as claimed in claim 10, wherein said temporary immobilizing means for immobilizing the link with respect to the first lever comprise a circular portion of the link, a notch in the circular portion, a lock member pivotally mounted on the first lever, the lock member comprising a first branch having at an end a nose portion which is cooperative with the notch in a circular portion of the link, and a spring for yieldably maintaining the nose portion in the notch.

13. A tongs as claimed in claim 10, wherein the rapidly-actuated means for opening the jaws comprise an adjustable thrust means integral with the second lever, a second branch of the lock member which second branch constitutes a heel cooperable with the adjustable thrust means to release the link with respect to the first lever and permit the separation of the first and second jaws by the return spring.

14. A tongs as claimed in claim 1, wherein said link is constituted by two parallel link members disposed on each side of the second jaw and the first and second levers are interconnected by their pivot connections to the second jaw and to the first and second levers respectively, whereas the first and second levers are each formed by two parallel members fixed to a handle.

* * * * *